June 22, 1965 B. A. MAYNEZ 3,190,480
PICK-UP CAMPER LIFTS
Filed May 31, 1960 3 Sheets-Sheet 1
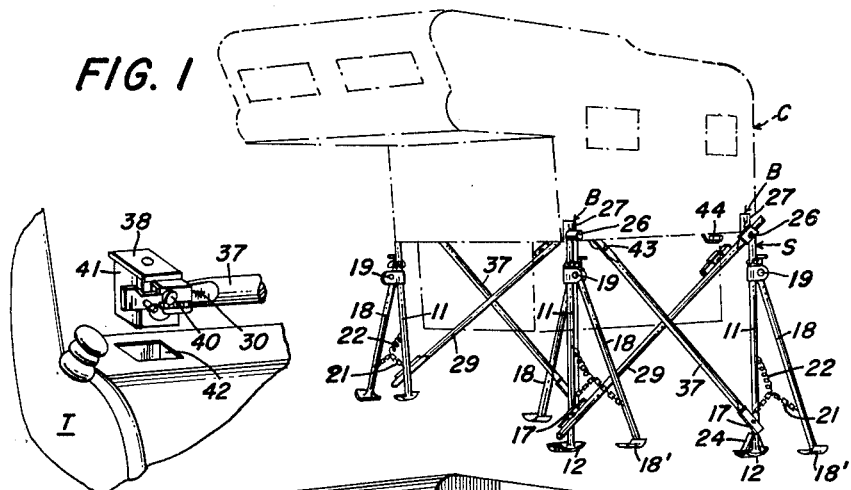
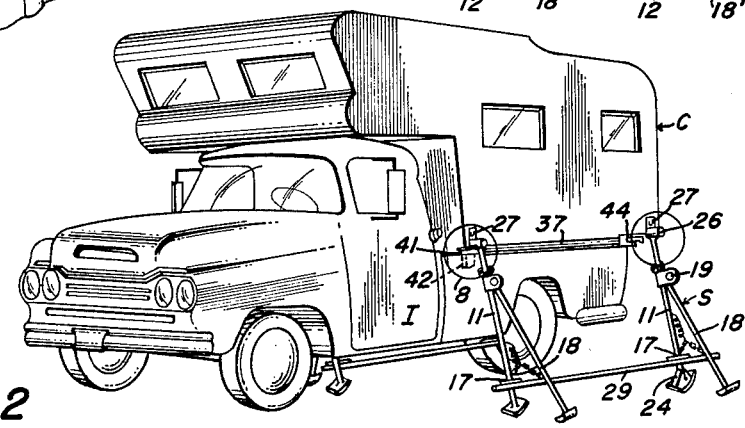
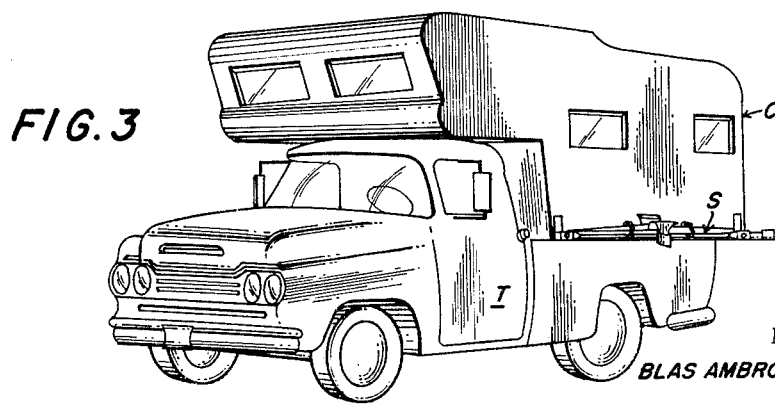
INVENTOR
BLAS AMBROSE MAYNEZ
BY
ATTORNEY

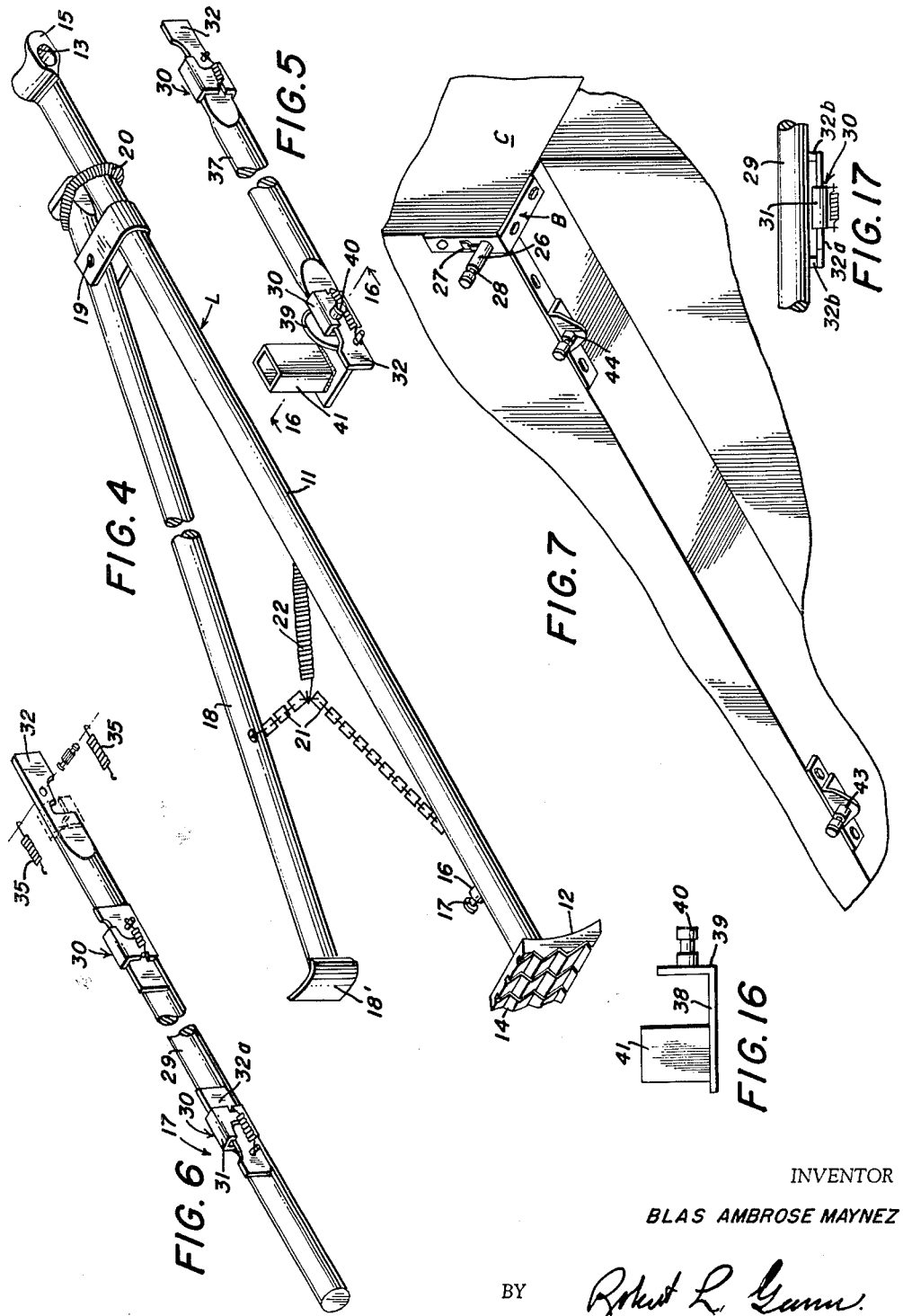

June 22, 1965  B. A. MAYNEZ  3,190,480
PICK-UP CAMPER LIFTS
Filed May 31, 1960  3 Sheets-Sheet 3
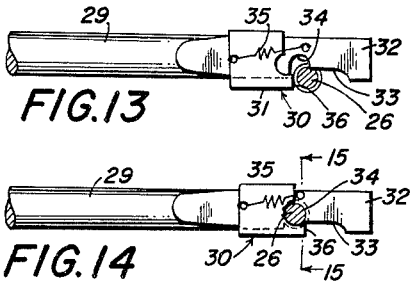
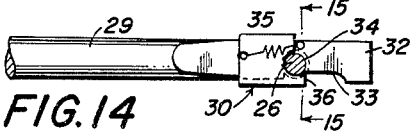
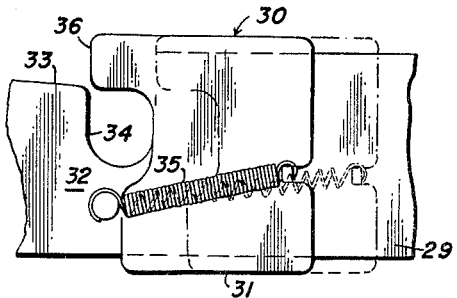
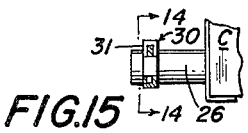
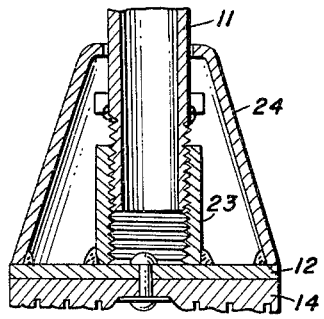
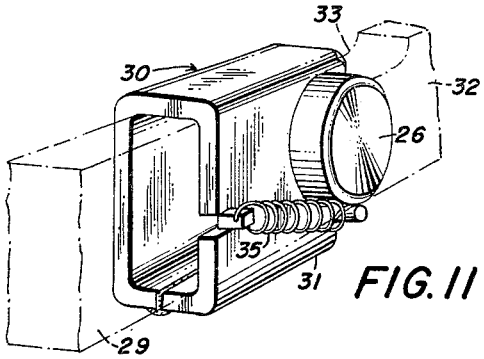
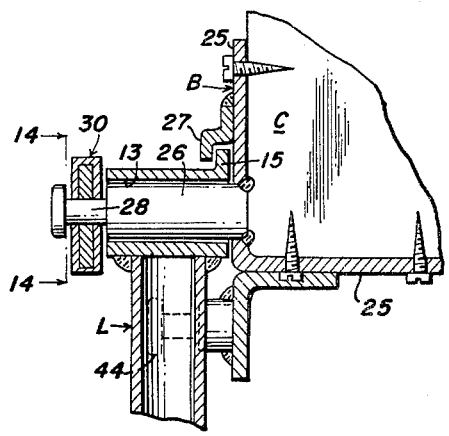
INVENTOR
BLAS AMBROSE MAYNEZ
BY Robert L. Gunn
ATTORNEY

United States Patent Office 3,190,480
Patented June 22, 1965

3,190,480
PICK-UP CAMPER LIFTS
Blas Ambrose Maynez, Mountain View, Calif.
(1035 Bayshore Blvd., Burlingame, Calif.)
Filed May 31, 1960, Ser. No. 33,051
3 Claims. (Cl. 214—515)

This invention relates to means for loading and unloading a camper, or a similar body, onto a motor truck by using the motive power of the truck.

The invention to be hereinafter described and claimed has been designed primarily for loading and unloading a camper of the type that is made expressly for use with motor trucks commonly known as pick-up trucks. However, it is to be understood that the essential parts of the invention are equally as applicable to handling other bodies such as coaches, loaded vans and even large containers filled with liquid, etc., and may be made adaptable for use with other types of vehicles, such as low bed trailers with slight modifications consisting mainly of changes in dimensions and proportions.

The principal object of this invention is to provide means for loading and unloading large bodies, such as campers, freight vans, large containers and the like, that have no under-carriage, onto a motor truck or trailers for transportation by using the motive power of the truck in conjunction with a specially designed stand for supporting the body to be loaded. The stand is designed to provide a stable support for the load so that it may be stored even though loaded with freight or, in case of a camper, with camping equipment aboard. The entire loading and unloading operation may be done by one man in conjunction with a motor truck.

Briefly stated, the invention amounts to equipping the body to be loaded with a collapsible supporting frame consisting of four legs, one at or near each corner of the camper. The legs are mounted on pivots and are slightly longer than the distance between the body and the ground when mounted on the truck so that when the legs are dropped to the ground and the truck is moved the load rocks up on the legs and the whole load is raised and supported on the frame above the truck body. Cross bracing, which is a part of this invention, is provided to create stable corners. Once raised, the motor truck is disconnected and the body left standing on its supporting frame. It is loaded on the motor truck in a reverse procedure.

In the drawings, I have illustrated a form of my invention in connection with the camper of a conventional type, loaded on a conventional pick-up truck. Other forms and uses with distinct advantages will become apparent as the description proceeds in conjunction with the drawings in which:

FIG. 1 shows my camper lift as it would appear when supporting a camper on the ground. This is the position in which the frame would be used for storing the camper, and would also be the starting position for loading the camper onto a pick-up truck. The camper is shown in dotted lines;

FIG. 2 shows the loading position with the pick-up truck under the camper ready to lower the camper on the truck body;

FIG. 3 shows the camper loaded on the truck ready for travel;

FIG. 4 is a perspective view of one of the supporting legs;

FIG. 5 is a perspective view of the power link for attaching the truck to the camper for loading;

FIG. 6 is a perspective view of the tie bar for locking the supporting frame in an upright position;

FIG. 7 is a perspective view of the rear bracket used for mounting the two rear legs on the camper;

FIG. 8 is an enlarged view of a fragmentary section shown in circle 8 of FIG. 2;

FIG. 9 is an enlarged fragmentary side view of the hook and lock means used on the ends of the tie bar and the power link;

FIG. 10 is a cross section of the foot of the supporting legs at the rear end of the camper, showing means for adjusting the height of the leg;

FIG. 11 shows the hook and lock for the tie bar locked in place;

FIG. 12 shows a fragmentary sectional view of the brackets at the rear corners of the camper.

FIG. 13 is a side view of the hook locking means showing a pin about to enter the detent slot;

FIG. 14 is a similar view showing the pin locked in the slot;

FIG. 15 is a side view of a pin showing how the lock fits on the end of the pin;

FIG. 16 is an end view of the lock that connects the power link to the truck, with the link disconnected; and FIG. 17 is a vertical view of the hook locks on the tie bar, taken in the direction of the arrow 17.

Referring to the drawings, and particularly to FIGS. 1, 2, and 3, it will be seen that I have illustrated my invention as comprising a stand or rack, generally designated S, supporting a camper in dotted lines, generally designated C.

In use, the camper is a completely separate unit, and usually is furnished with the necessary camping equipment inside and is designed to be mounted on a truck intact and moved about from place to place for camping purposes. It commonly weighs several hundred pounds and normally requires not less than four men to load it on a truck. My invention is designed to load and unload campers of this type on a conventional pick-up truck by one man alone with the aid of the truck.

The rack, or stand, embodied in my invention consists of four legs, one of which is shown in FIG. 4, and designated L in its entirety. Since the legs are fundamentally the same in construction, the description of one will serve for all. Here it will be seen the leg comprises a standard 11 adapted to stand upright, having a foot piece 12 on the lower end and a hole 13 on the upper end. The foot piece 12 should preferably be slightly curved, as shown to facilitate a rolling movement of the foot on the ground when the camper is raised on the frame. Also, a corrugated piece of suitable material 14 should be used on the under surface of the foot to provide a non-skid surface. On the extreme upper end, I provide a small upstanding flange 15 near the hole 13 which is for the purpose of rotatably holding the leg on the pivot on the camper, to be later described. Near the lower end of the standard 11 just above the foot 12, there is provided a small knob 16 having an annular groove 17 near the outer end. The purpose of this knob will be described later with reference to bracing the stand when used for supporting a camper in storage. The leg carries a sway brace adapted to automatically adjust itself against side sway and hold the camper upright on uneven surfaces on which the camper is set up. As shown, this brace consists of a second standard 18 pivotally mounted at its upper end to the standard 11 as shown at 19. For better footing, a foot piece 18' may be used in the lower end which should be curved as shown. The brace leg 18 is yieldingly forced to swing outwardly on its pivot point substantially in line with the axis of the pivot which passes through hole 13 by means of a spring 20 which tends to pull the upper end of the leg inwardly toward the standard 11 thereby swinging the lower part outwardly. To yieldingly limit the swing of the leg 18 and at the same time provide a means whereby the leg may be adjustably held against outward swing, I incorporate a chain 21 and a spring 22 between the standard 11 and the standard 18. The chain 21 connects the two standards together, while the spring 22 is attached to one of the standards, in this case, the standard 11. The other end is free to be attached to various points along the chain 21. The particular advantage of this spring and chain arrangement occurs after the camper is unloaded and set up for use. In some cases, where the ground is soft or uneven, or the camper tends to rock slightly, the tension of the spring 22 on chain 21 will tend to draw the leg 18 inwardly and take up the slack in the side bracing.

In FIG. 10, I have shown means for adjusting the height of the standard 11. This means is not intended to be used on all the legs, and in some cases may not be needed at all. However, there may be occasions where the frame will need leveling and the feature shown here may be used easily and quickly. It is suggested that one or both of the back legs be equipped with the adjustment feature. As shown, this means consists of attaching the regular foot piece 12, see FIG. 4, with its corrugated material 14 to a screw threaded nipple 23 which in turn is screw threadedly mounted on the lower end of the standard 11. To restrict the travel of the threads and strengthen the device, I use a strap 24 which is attached to the foot 12 in any suitable manner and extends upwardly along the standard 11 and is loosely engaged therewith. With this arrangement, the overall length of the standard 11 may be changed to suit the prevailing conditions by adjusting the foot on the lower end.

The frame is mounted on the camper by mounting four legs L on pivot points one each at or near each corner of the camper. The pivot points all take substantially the same form, one of which is shown in FIGS. 7 and 12. I recommend that brackets such as shown in an enlarged form in FIG. 12 be used. Here it will be seen is a bracket B consisting of a piece of strap iron 25 bent around a corner of the camper C and suitably attached thereto. A stud 26 extends outwardly from the bracket upon which is mounted a leg L by means of the hole 13 in the upper end of the leg. The leg is rotatably held on the stud by the small flange 15 which extends under a flange 27 mounted on the bracket B. On the outer end of the stud, I form an annular groove 28 which is for the purpose of receiving and holding one end of a tie bar, to be later described.

There are four of these legs, one at or near each corner of the camper, and each leg is longer than the height of the truck body which picks up the camper, so that when the camper is mounted on the stand, the truck can be backed under it for loading.

There are two more pieces of equipment that go with the stand and the means for loading and unloading the camper. One is the tie bar which is shown in FIGS. 6, 13, and 14. This is the bar shown as 29 in FIGS. 1 and 2. In FIG. 1, it is shown as bracing against longitudinal sway, while in FIG. 2, it is shown as locking the base of the two legs together during the loading or unloading step.

Since it is the intention of this invention to provide a device whereby one man can load and unload campers of the type described, the invention also includes an automatic hook and lock generally designated 30 at the ends of the tie bar, and also the power link. The power link is best shown in FIG. 5, while the hook and the lock are shown in FIGS. 13, 14 and 15. Since the hook and the lock are the same in all cases, one description will serve for all purposes.

In FIGS. 13, 14 and 15 I have shown the hook and lock as applied to the tie bar 29. The same construction is used on the power link. As will be noted, the tie bar is used in two different places which requires two different lengths of the bar as shown in the position of FIG. 1, and the other in FIG. 2. By referring to FIG. 6, it can be seen how this is done. It will be noted the tie bar 29 has one end shaped to take the hook and lock 30, while there are two other hooks and locks at intermediate points on the rod 29. These hooks and locks embody the same construction as previously described, but are mounted on the rod in a different manner. Instead of flattening a portion of the rod as explained above, the hook and lock are mounted on the side of the rod by offsetting a flat portion 32a similar to the portion 32 of the rod 29 from the side of the rod by small spacers 32b, thus allowing a sleeve 31 to slide freely thereon. In all other respects the hooks and locks are the same throughout the device. Flat bars and rods may be used in place of the tubular rods and serve the purpose equally as well, and in some cases may have an advantage.

In FIGS 13, 14 and 15, I have shown the details of my hook lock. As seen here, it comprises the sleeve 31 slidably mounted on a reduced portion 32 of the rod 29. Where flat bars are used there need be no reduction or flattening of the bar. One edge of the flat portion is cut way, preferably the under edge, as shown at 33, and a notch 34 formed at the end of the cut away portion. The sleeve 31 is yieldingly held in a normally closed position, see FIGS. 9, 11 and 14, by a spring 35 so that a finger 36 will close the open side of the notch 34. Under this arrangement, when the tie bar 29 is laid on a specially formed pin, such as pin 26 with an annular groove 28 formed near the end of the pin, see FIG. 12, with the cut away portion 33 lying in the groove 28, and the bar is forced to slide over the pin by rocking the camper on the legs L, the pin 26 will engage the finger 36 and force the sleeve back along the flattened portion 32 of the bar 29, thus allowing the pin to slide into the notch 34, whereupon the sleeve 31 snaps back into normal position under force of the spring 35 and the pin is locked in the notch. To unlock the pin from the notch, the sleeve 32 is pulled back and the bar lifted from the pin.

The same type of hook and lock is used on the power link which is shown and designated as a rod or bar 37 in FIG. 5. The bar 37 has both ends flattened to form the flat portions 32 heretofore mentioned and a hook and lock 30 on each end. On one end, I have shown a special connection for attaching the power link to the body of the truck for loading or unloading the camper on the truck. As seen in FIG. 16, the connection consists of a plate 38 bent to form an upstanding flange 39 upon which a pin 40 similar to the pin 26 is mounted. Spaced away from the flange 39 there is also mounted on the plate a plug member 41 which is adapted to be seated in a conventional stake hole 42 in the body of the truck T, see FIG. 8. It is to be understood that in use the member 41 points downwardly and drops into the hole 42.

For loading a camper of the character described, on the body of a pick-up truck, the procedure is substantially as follows:

Starting from a standing, or a storage, position of the camper, shown in FIG. 1, it will be observed that the legs are locked in place and the stand S is stable. Since both sides are substantially the same, a single description will be entered, it being understood that the same operation takes place on both sides. In the standing position, the power link is used as a brace and is connected to knob 16 on the lower part of the rear leg and to knob 43 on the body of the camper. The tie bar 29 runs from a similar knob 16 on the front leg to the pivot pin 26.

With the camper in this position, the truck is backed under it to the proper position for loading. The power link is removed and one end is connected to a pin 44 near the rear end of the camper and the other end to the pin 40 on the special connection which ordinarily rides in the stake hole in the truck body. Since both these pins are provided with the annular groove near the outer end, it is recommended that one end be connected and locked in place and the other end slipped into place by moving the truck. With the camper locked to the truck by the above procedure, I then set the brakes on the truck. The tie bar 29 is then removed from the pin 26 and connected to the pin 16 on the lower end of the rear leg, thereby spacing the lower ends of the legs, see FIG. 2. The driver then moves the truck forward slowly and the camper drops into the truck body thereby freeing the legs so they may be moved up and stored as shown in FIG. 3. The whole outfit is now ready for traveling.

During traveling, the power link is left in place to secure the camper to the truck and the legs L and the tie bars are swung up into the position shown in FIG. 3, where they are suitably supported by ties or laid on top of the sides of the truck and held in place by any suitable means. To unload, the procedure is just the reverse of the above.

In some cases, it may be desirable to load and unload campers into low bed trailers. The procedure is identical, the only difference being that the camper is raised and lowered farther, or the legs themselves may be properly shortened.

Although I have shown and described my invention in connection with a pick-up truck and have confined the description to a camper body, it is to be understood that this disclosure is intended to cover all such uses, modifications, refinements, and alterations that come within the scope of the disclosure and the invention as defined by the claims.

I claim:

1. For use with a camper having laterally extending pins near the base of the body thereof, a leg comprising an upright standard having a transverse hole near the end for rotatably mounting said leg on one of said pins, a second standard having its upper portion swingably connected to said first mentioned standard near the upper end thereof, means for yieldably forcing said second standard to swing outwardly with respect to said first mentioned standard, a chain connecting the two standards together near the lower ends thereof, and a coiled spring having one end connected to one of said standards and the other end adapted to be connected to selected intermediate points on said chain.

2. A mechanism as set forth in claim 1 wherein the coiled spring having one end connected to one of said standards is connected to said standard at a point spaced from the point of connection of said chain to said standard.

3. In combination with a camper having a laterally extending pin near each lower corner of the body thereof, a flange mounted on said body and spaced therefrom near each of said pins, a plurality of legs adapted to be detachably mounted on said pins respectively, each of said legs comprising an upright standard having a transverse hole near the upper end adapted to rotatably fit over one of said pins, a flange on said standard near said hole adapted to slidably fit beneath said first mentioned flange to hold said leg on said pin, a second standard having its upper portion swingably connected to said first mentioned standard near the upper end thereof, means for yieldably forcing said second standard to swing outwardly with respect to said first mentioned standard, and adjustable means for yieldably restraining said second standard from so swinging.

References Cited by the Examiner

UNITED STATES PATENTS

| | | | |
|---|---|---|---|
| 416,519 | 12/89 | Troxell | 214—515 |
| 457,811 | 8/91 | Cook | 214—383 |
| 816,268 | 3/06 | Steindorf | 248—166 X |
| 1,329,956 | 2/20 | Lodien | 214—515 |
| 2,652,184 | 9/53 | Loucks | 182—169 X |
| 2,703,659 | 3/55 | Hutchins | 214—515 |
| 2,928,562 | 3/60 | Gollnick | 214—302 |
| 2,997,127 | 8/61 | Wojtowicz | 182—172 |
| 3,002,760 | 10/61 | Lee | 214—515 |

FOREIGN PATENTS

| | | |
|---|---|---|
| 1,181,988 | 6/59 | France. |
| 418,121 | 8/55 | Germany. |
| 696,728 | 9/53 | Great Britain. |

HUGO O. SCHULZ, *Primary Examiner.*

ERNEST A. FALLER, Jr., MORRIS TEMIN, GERALD M. FORLENZA, *Examiners.*